United States Patent
Kankkunen et al.

(10) Patent No.: US 9,721,412 B2
(45) Date of Patent: Aug. 1, 2017

(54) DOOR LOCK AND ARRANGEMENT FOR TRANSFERRING POWER AND INFORMATION TO DOOR LOCK

(71) Applicant: ROLLOCK OY, Espoo (FI)

(72) Inventors: Hannu Kankkunen, Espoo (FI); Timo Toivonen, Helsinki (FI)

(73) Assignee: ROLLOCK OY, Espoo (FI)

( * ) Notice: Subject to any disclaimer, the term of this patent is extended or adjusted under 35 U.S.C. 154(b) by 0 days.

(21) Appl. No.: 14/897,533

(22) PCT Filed: Jun. 4, 2014

(86) PCT No.: PCT/FI2014/050449
§ 371 (c)(1),
(2) Date: Dec. 10, 2015

(87) PCT Pub. No.: WO2014/199009
PCT Pub. Date: Dec. 18, 2014

(65) Prior Publication Data
US 2016/0163139 A1   Jun. 9, 2016

(30) Foreign Application Priority Data
Jun. 11, 2013 (FI) ..................... 20135636

(51) Int. Cl.
*G05B 19/00* (2006.01)
*G07C 9/00* (2006.01)
(Continued)

(52) U.S. Cl.
CPC ...... *G07C 9/00309* (2013.01); *E05B 47/0001* (2013.01); *E05B 47/0046* (2013.01);
(Continued)

(58) Field of Classification Search
CPC ...... G07C 9/00309; G07C 2009/00634; G07C 2009/00769; E05B 47/0001;
(Continued)

(56) References Cited

U.S. PATENT DOCUMENTS

2009/0308116 A1* 12/2009 Lambrou ............... E05B 47/02
70/277
2011/0084799 A1* 4/2011 Ficko ................. G07C 9/00904
340/5.65
(Continued)

FOREIGN PATENT DOCUMENTS

DE   36 12 761 A1   10/1987
EP   2 660 785 A2   11/2013
(Continued)

OTHER PUBLICATIONS

Y.P. Su "Mutual inductance calculation of movable planar coils on parallel surfaces" IEEE transactions on power electronics, vol. 24, No. 4 Apr. 2009.*
(Continued)

*Primary Examiner* — Dhaval Patel
(74) *Attorney, Agent, or Firm* — Birch, Stewart, Kolasch & Birch, LLP

(57) ABSTRACT

Lock arrangement including a counterpart of the lock and a lock with a lock case. The lock case, which can be installed in a door, includes a locking latch and a latch mechanism, which includes an electrical device for opening and/or closing the locking latch. The counterpart of the lock can be installed in the frame of the door. A device for wirelessly sending electrical power to the lock case and/or into connection with the lock case is arranged in the counterpart of the lock; a mechanism is arranged in connection with the lock case for wirelessly receiving electrical power from the device for sending electrical power that is arranged in connection with the counterpart of the lock. Electrical power
(Continued)

is arranged to be transmitted from the device for sending electrical power to the mechanism for receiving electrical power, when the lock case and the counterpart of the lock are at a certain distance from each other. The mechanism for receiving and device for sending electrical power are also arranged to transfer encrypted information relating to the operation of the lock.

14 Claims, 6 Drawing Sheets

(51) Int. Cl.
*H04B 5/00* (2006.01)
*E05B 47/00* (2006.01)

(52) U.S. Cl.
CPC ......... *H04B 5/0031* (2013.01); *H04B 5/0037* (2013.01); *H04B 5/0093* (2013.01); *E05B 2047/0048* (2013.01); *E05B 2047/0061* (2013.01); *E05B 2047/0067* (2013.01); *E05B 2047/0072* (2013.01); *E05B 2047/0082* (2013.01); *E05B 2047/0094* (2013.01); *G07C 2009/00634* (2013.01); *G07C 2009/00769* (2013.01)

(58) Field of Classification Search
CPC ......... E05B 47/0046; E05B 2047/0072; E05B 2047/0048; E05B 2047/0067; E05B 2047/0094; E05B 2047/0082; E05B 2047/0061

USPC ....... 340/5.64, 5.61, 426.18, 5.65, 5.7, 5.22, 340/12.22; 70/91, 263, 277
See application file for complete search history.

(56) References Cited

U.S. PATENT DOCUMENTS

2011/0241826 A1* 10/2011 Blackwell, Jr. .... G07C 9/00817
340/5.22
2014/0197692 A1 7/2014 Chen et al.

FOREIGN PATENT DOCUMENTS

| FR | 2677396 A1 | 12/1992 |
| WO | WO 00/77330 A1 | 12/2000 |
| WO | WO 2008/011657 A1 | 1/2008 |
| WO | WO 2011/128901 A1 | 10/2011 |

OTHER PUBLICATIONS

Aktuell Säkerhet, "Wireless Charging of Electric Locks," Oct. 12, 2012 (with English translation).
Third Party Observation cited in corresponding EP Application No. 14810291.6 on Dec. 14, 2016 (in English).
International Search Report issued in PCT/FI2014/050449, mailed on Oct. 2, 2014.

* cited by examiner

DOOR LOCK AND ARRANGEMENT FOR TRANSFERRING POWER AND INFORMATION TO DOOR LOCK

FIELD OF THE INVENTION

The invention relates to a door lock and an arrangement for transferring power and information to the door lock.

BACKGROUND OF THE INVENTION

Known in the art are door locks comprising a lock case and a locking latch, which door locks can be opened and closed mechanically. Also known in the art are electrical locks, which can be controlled to open and close by means of electrical commands and electrical opening means. In the arrangements known in the art, the electrical connections of a lock that is in a door are arranged e.g. by means of wires or other corresponding conductors through the frame of the door. The conductors could be led to the door lock e.g. via the door frame from the hinge side of the door.

Leading the conductors requires a passageway in the door for the conductors and, that being the case, a conventional door cannot be used with an electric lock without adapting the door. In their present state, pre-ordered special doors must be used for doors that are provided with an electric lock, said doors having passageways for electrical conductors, or otherwise a conventional door must be adapted by making in it passageways going through the door for the conductors. Both methods are expensive relative to the costs of conventional doors. In addition to this, according to regulations holes may not be made in some doors, such as e.g. in fire doors.

BRIEF DESCRIPTION OF THE INVENTION

The aim of the current invention is to achieve a new type of lock and an arrangement for transferring power and information to an electrical lock that can be installed in a door. The arrangement comprises both a lock and a counterpart of the lock, i.e. a striking plate, which can be installed in the door frame.

The lock arrangement according to the invention comprises a counterpart of the lock and a lock comprising a lock case. The lock case comprises a locking latch and a latch mechanism, which comprises electrical means for opening and/or closing the locking latch. The counterpart of the lock can be installed in the door frame. Means for wirelessly sending electrical power to the lock case and/or into connection with the lock case are arranged in connection with the counterpart of the lock, and means are arranged in connection with the lock case for wirelessly receiving electrical power from the means for sending electrical power that are arranged in connection with the counterpart of the lock. Electrical power is configured to be transmitted from the means of the counterpart of the lock that are for sending electrical power to the means of the lock case that are for receiving electrical power, when the lock case and the counterpart of the lock are at a certain distance from each other, i.e. when, for example, the door is closed. The electrical power received is conducted to the electronics of the lock and/or to electrical means for opening and/or closing the locking latch. The means for receiving and for sending electrical power are also arranged to transfer encrypted information relating to the operation of the lock.

The solution according to the invention now being presented has some significant advantages compared to prior-art solutions. By means of the solution according to the invention, wiring coming through the structure of the door to the lock that is in the door can be avoided. In this way electrical locks according to the invention can be used in conventional doors in which space for wires has not been arranged.

In one embodiment of the invention, the wireless transfer of power is implemented as inductive power transmission.

In one embodiment of the invention, the information to be transferred is encrypted before sending it to the lock of the door or to the counterpart of the lock. In this way unauthorized systems are not able to read or produce corresponding information. The information can be, for example, the status information of the lock, coupling information and/or a control command. The information can be transmitted bi-directionally, i.e. from the lock to the counterpart of the lock and from the counterpart of the lock to the lock.

In one embodiment of the invention, the lock and the counterpart of the lock identify each other by means of two-way authentication always at the start of an information transfer.

BRIEF DESCRIPTION OF THE FIGURES

In the following, the invention will be described in more detail by the aid some embodiments with reference to the drawings 1-6, wherein.

DETAILED DESCRIPTION OF THE INVENTION

Figure 1:
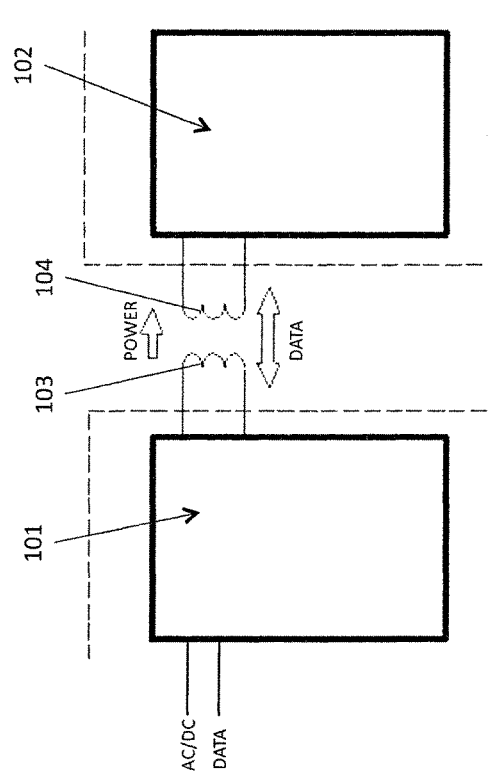
FIG. 1 presents a schematic view of the operating principle of one embodiment of the invention.

FIG. 1 presents a schematic view of the solution of one embodiment of the invention. In the solution according to the invention the counterpart 101 of the lock, said counterpart being fitted into the frame of the door, scans for the presence of the lock 102 of the door at regular intervals. The lock 102 and the counterpart 101 of the lock comprise coils 103, 104, which are used for the wireless transfer of electrical power. When the lock 102 is at a suitable distance from the counterpart 101 of the lock, e.g. when the door is closed, the counterpart 101 of the lock controls current to the transmitter coil 103, which produces a magnetic field. The magnetic field connects to the receiver, i.e. to the coil 104 of the lock, and forms alternating current there, which is rectified and filtered. The power transfer is thus based on magnetic induction, correspondingly to that in a mains transformer (primary and secondary coils). In the solution according to the invention e.g. two planar coils are used, instead of an iron core transformer. In practice the medium of the coils is air, in some embodiments of the invention partly also plastic.

When the arrangement is functioning, the unit sending power, i.e. the counterpart 101 of the lock, scans for the presence of the lock 102 at regular intervals (so-called ping function). If the lock 102 does not respond to the scan and/or if the object is not identified, the power transfer is not switched into use. In this way the warming of the wrong metal objects and also the unnecessary power consumption of the device are prevented.

In a lock application the length of an identification interval affects the delay in connection of power transfer, and therefore in the operation of the lock, after the door has closed.

In one embodiment of the invention, instead of inductive power transfer, the principle of magnetic resonance or some other method can be used for wirelessly transferring electrical power from the counterpart of the lock to the lock.

Figure 2:
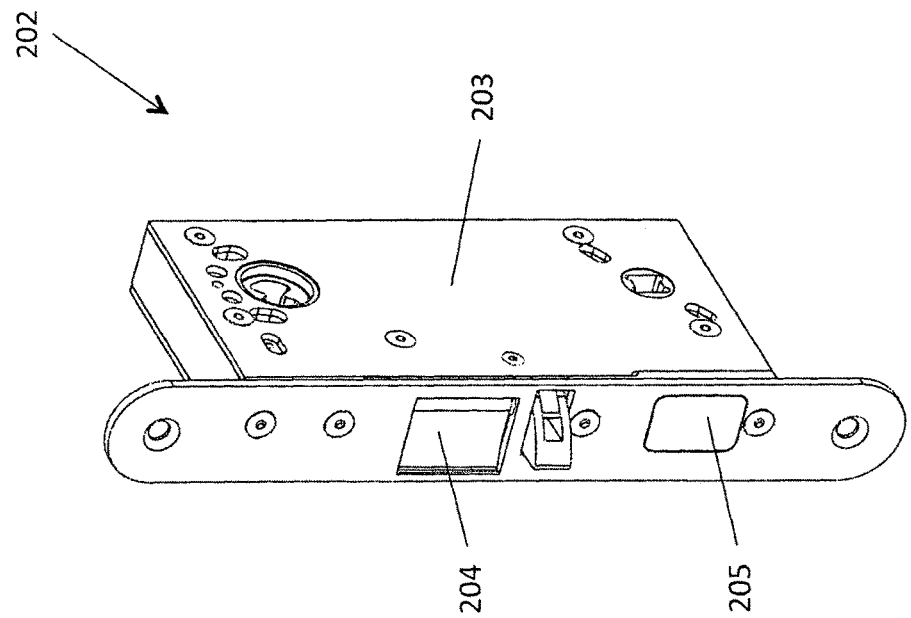
FIG. 2 presents the structure of a lock according to one embodiment of the invention.

FIG. 2 presents by way of example the structure of a lock according to one embodiment of the invention. The lock comprises a lock case 203, which lock case comprises a locking latch 204 and a latch mechanism. The latch mechanism comprises electrical means for opening and/or closing the locking latch. Means are arranged in connection with the lock case 203 for wirelessly receiving 205 electrical power from the means for sending electrical power that are arranged in connection with the counterpart of the lock.

In one embodiment of the invention, the lock functions mechanically and the mechanical lock can also be opened and/or closed electrically.

Figure 3:
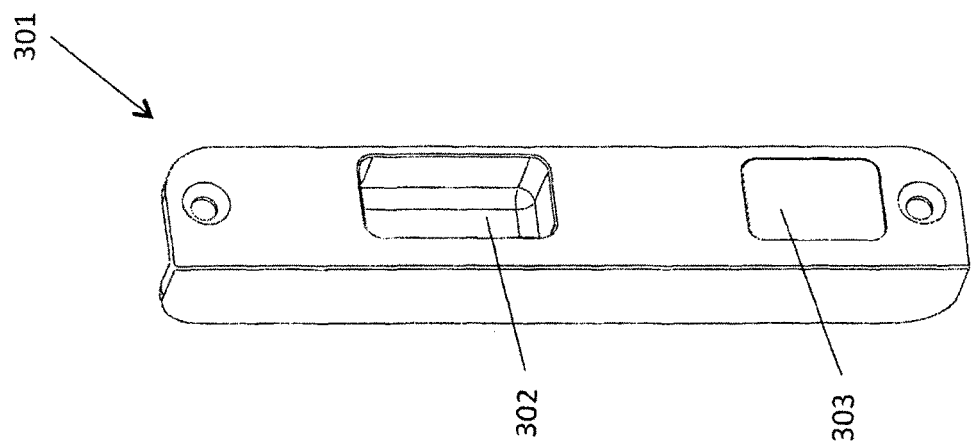
FIG. 3 presents the structure of a counterpart of the lock according to one embodiment of the invention.

FIG. 3 presents a counterpart 301, according to an embodiment of the invention, of the lock, said counterpart comprising an aperture for the locking latch 302 of the lock and means for sending 303 electrical power. The counterpart of the lock can be fixed into the door frame at a point corresponding to the lock of the door, and wiring to the counterpart of the lock is arranged via the door frame.

In the solution according to the invention, the means for receiving 205 and for sending 303 electrical power can be coils. A lock environment is characteristically narrow and high in structure. The electronics used in the arrangement according to the invention can be disposed inside the lock to some extent more freely than the coils that transfer power—the coils, on the other hand, must be brought close to each other on the front surfaces of the lock and of the counterpart. The coils can be implemented to be planar in structure (planar coils).

Figure 4:
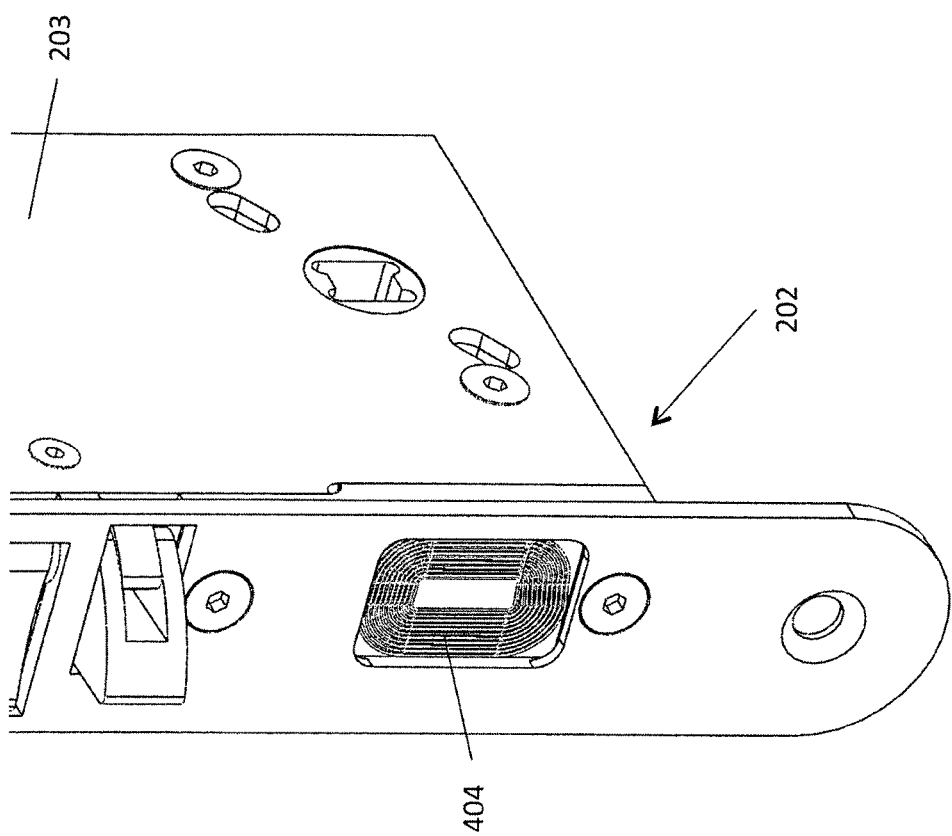
FIG. 4 presents the structure of a lock according to one embodiment of the invention, wherein a coil used for receiving electrical power is presented.

FIG. 4 presents a magnification of the bottom part of the lock. The lock of FIG. 4 corresponds in its structure to the lock presented in FIG. 2, but in it a coil 404 used for receiving electrical power is presented.

The width of the magnetic field between the coils is small in the lateral direction. Thus the metal in the environs of the transmitter coil and receiver coil hardly affects the functionality of the power transfer and the resonance circuits at all.

Shielding the other electronics behind the coils from interference and also directing the magnetic field, a relatively thin, e.g. 1-2 mm thick, ferrite sheet can generally be used. Ferrite material is used as a suitable material for shielding from interference. The ferrite sheet that is background material behind the transmitter coil and receiver coil guides the direction of the magnetic field and prevents the field spreading behind a coil, and thus for its part shields the other electronics from interference.

In the solution according to the invention the lock and the counterpart of the lock, as well as the means comprised in them for sending and receiving electrical power, are arranged in the door and in the door frame in such a way that the door can be opened and closed but the transfer of information only succeeds when the door is closed. It is not good for the transfer of electrical power and the transfer of information to operate when the door is open because in this case the door would appear to the arrangement, and e.g. to access control systems, to be closed even though it was really open.

In one embodiment of the invention, in the lock arrangement the transfer of electrical power is possible at an operating range of approx. 10 mm. The maximum distance between the frame and the lock when the door is closed is typically approx. 6 mm. Both the transmitter coil and the receiver coil can be shielded with an approx. 2 mm layer, in which case an operating range of approx. 10 mm is sufficient in a lock application.

In the solution of the invention there can also be a function for detecting metal objects, with which possible warming, owing to induction, of a metal object brought into the proximity of the frame can be prevented. The function can be implemented by using communication between the devices at regular intervals occurring in connection with detection of the presence of the lock. The detection can be used directly also for detecting closing of the door and thus for connecting supply power when the door is closed.

In the arrangement according to the invention information can also be sent between the lock and the counterpart of the lock wirelessly. The transfer of information can be implemented with the means used for the transfer of electrical power.

The information to be transmitted in prior-art applications of wireless power transfer is not specially protected or encrypted because the target has been that all the devices are able to control (base station) or receive (receiver) the wireless transfer of power. From the viewpoint of a lock application, however, this is not a desirable situation because from the viewpoint of security it cannot be permissible that the lock can be controlled by the action of an unknown user/device.

In the solution according to the invention the information transfer is digital and authentication methods and/or encryption methods to ensure data security are used in a lock application.

By means of encryption and authentication it is ensured that the lock reacts only to commands transmitted by an identified (acting as the correct pair) counterpart. An unauthorized device that does not know the encryption key used cannot create or send to the lock a control message in an acceptable format and therefore cannot mislead the lock into the incorrect operating mode. The counterpart of the lock accepts and transmits onwards only the status information it receives from an identified lock (acting as the correct pair). An unauthorized device that does not know the encryption key used cannot send status information in an acceptable format and therefore cannot mislead the access control system. The encryption key used is not sent at any stage to another device. The encryption key used is kept in the device in such a way that it would not be economically reasonable to uncover it.

The aim of authentication is therefore to ensure that the devices communicating with each other recognize one another. In this way, a fraudulent device cannot control one of the devices. Likewise, transmission of information to a fraudulent device is also prevented. Authentication can be performed before permitting use of the service.

Authentication can be one-way (server identifies user) or two-way (service identifies user, and the user the service).

In the solution according to the invention the lock ensures, by means of authentication, before executing a command, that the control command comes from an identified device (from the identified counterpart of the lock). By checking the identity of the counterpart of the lock, the lock ensures that the device of an unauthorized person (intruder) cannot control the operation of the lock.

The counterpart of the lock ensures, by means of authentication, before transmission to the building automation of the status information received from the lock, that the status information originates from an identified device (from the identified lock). In this way the counterpart of the lock ensures that incorrect status information delivered by the device of an unauthorized person (intruder) does not travel onwards and endanger the safety of the locking.

After successful authentication, information, which is encrypted, can be transferred between the lock and the counterpart of the lock. Various encryption technologies used in telecommunications or in computers can be used as encryption methods for encrypting the messages of the information transfer. Encryption means the converting of the plain text information to be encrypted into a type of format that makes clarification of the original information either impossible or too expensive (i.e. breaking the encryption takes too much time or resources compared to the value of the encrypted information).

The handling of encrypted information is generally two-directional: the information to be encrypted can be converted into an unreadable format for encrypting the information and correspondingly the encrypted information can be returned back to the original format for utilizing it. Examples of algorithms to be used for the encryption of the information are, inter a/ia, DES, AES and Blowfish.

In the solution according to one embodiment of the invention the data transfer speed between the lock and the counterpart of the lock is approx. 1 kBit/s. This transfer speed is sufficient for the solution according to the invention, because the amount of information to be transferred between the counterpart of the lock and the lock is small despite the authentication and encryption protocols.

Figure 5:
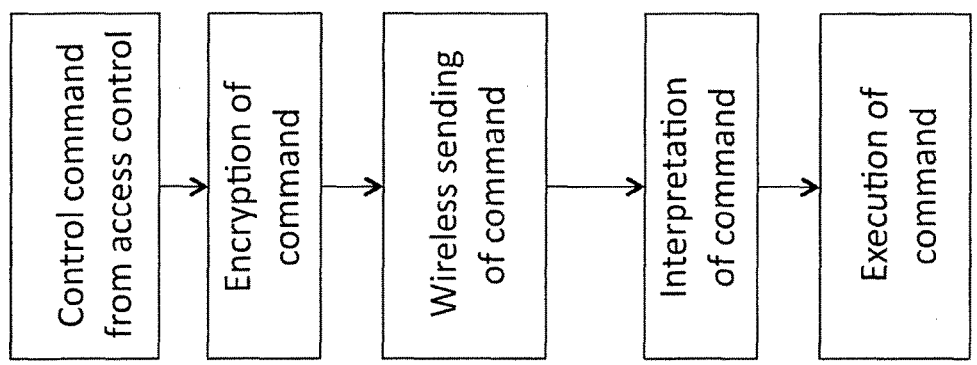
FIG. 5 presents a functional diagram of the operation of one embodiment according to the invention, when the door is closed.

FIG. 5 presents the operation of a lock arrangement of one embodiment according to the invention, in a situation in which the door is already closed. When it is desired to open the lock, the access control system or some other access control device sends a command to the counterpart of the lock of the door about opening the lock of the door. Before sending a command over a wireless interface, the command is encrypted. The command can be encrypted in the counterpart of the lock or already previously, e.g. in the access control system. After encryption, the counterpart of the door sends a message to the lock of the door utilizing the components to be used in the transfer of electrical power. When the lock of the door receives the message, the encryption is decrypted and the content of the message interpreted. After this, the lock executes the command, in other words e.g. opens the lock, locks the lock, or sends the status information of the lock to the counterpart of the lock.

If the lock wants to send a message to the counterpart of the lock, the system functions in such a way that the lock of the door encrypts the message (e.g. its status information) and sends it utilizing the components used for receiving electrical power. Correspondingly, the counterpart of the lock receives the message and sends it onwards. When the encryption of the message is decrypted, the content of the message can be read. The encryption of a message can be decrypted e.g. in the counterpart of the lock or not until the final receiving destination e.g. in the access control system.

For practical reasons, e.g. in a situation in which a damaged lock is replaced with a new lock, the identifier and encryption key of the new lock to be installed can be set in connection with the installation. For permitting the changing of the identifier, the authentication method described above can be used between the lock and/or the counterpart of the lock and the replacement tool.

Figure 6:
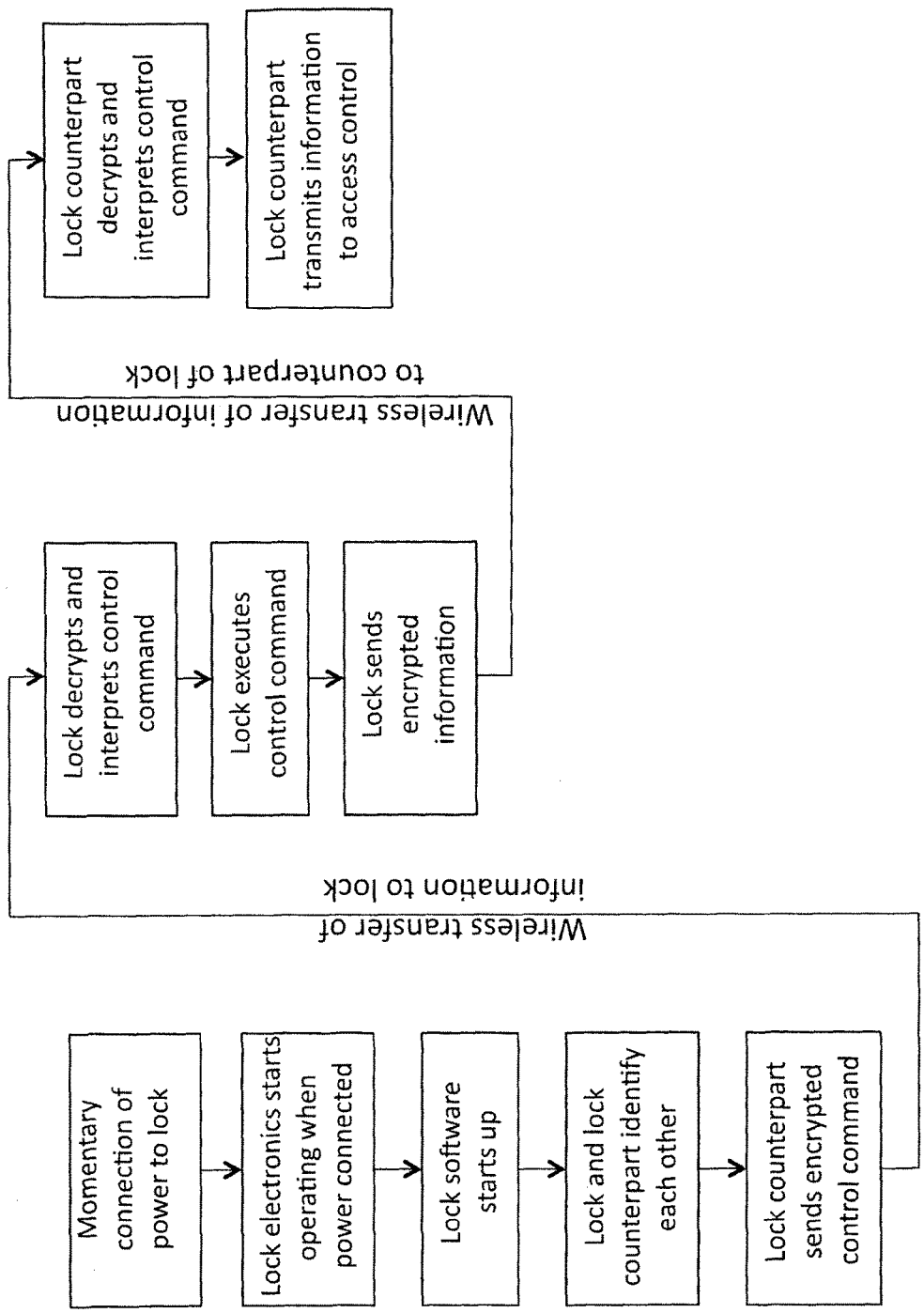
FIG. 6 presents a functional diagram of the operation of one embodiment according to the invention in a situation in which the formation of a connection between the lock and the counterpart of the lock is starting.

FIG. 6 presents a functional diagram of the operation of one embodiment according to the invention from the start of the connection formation of the lock and the counterpart of the lock. When the door is open, there is no data link between the lock and the counterpart of the lock. The counterpart of the lock occasionally switches power to the lock so that the electronics of the lock would wake up when the door is closed fully and the transfer of power succeeds. When closing the door fully, the distance of the counterpart of the lock and the lock from each other is such that the transfer of power can be started. In this case the electronics of the lock activates as a consequence of the connection of power and the software of the lock starts up and begins to receive electrical power.

When the connection transferring electrical power has been formed, the lock and the counterpart of the lock can create a data link between the lock and the counterpart of the lock. For creating the data link, the lock and the counterpart of the lock authenticate each other. After authentication the counterpart of the lock sends an encrypted control command and the command is sent via the means of the counterpart of the lock sending electrical power, over the wireless interface, to the lock via the devices of the lock receiving electrical power. After this the lock decrypts and interprets the control command and executes the control command.

The lock can send e.g. its status information in encrypted format to the counterpart of the lock. In this case the counterpart of the lock receives, by the aid of the means sending electrical power, the status information sent by the lock, which status information the lock sends by the aid of the means receiving electrical power. After receiving, the counterpart of the door decrypts and interprets the status information. The counterpart of the lock can transmit the status information onwards, e.g. to the access control. Information can also be sent in encrypted format to the access control or in encrypted format to some other corresponding system or unit, where the encryption is then decrypted.

When the door is opened, the transfer of electrical power and data link between the lock and the counterpart of the lock is disconnected. When the door is closed again, the aforementioned procedures are performed again from the beginning. After closing of the door, the status of the lock can be set to a status corresponding to the opening of the door or to a new control command received.

The lock can be without current when the door is open because in this case there is no need to control it. The lock functions in this case as a mechanical lock. Also, the access control system or the counterpart of the lock can deduce that the door is open when the transmission of power cannot be performed or a data link to the door cannot be formed. In one embodiment of the invention, the lock can have a battery, which keeps the electrical components of the lock on when the power transfer is disconnected.

The invention thus relates to a lock arrangement, which comprises a counterpart 101, 301 of the lock and a lock 102, 202 comprising a lock case 203. The lock case 203, which can be fixed into a door, comprises a locking latch 204 and a latch mechanism, which comprises electrical means for opening and/or closing the locking latch. The counterpart 101, 301 of the lock can be installed in the door frame. Means for wirelessly sending 303 electrical power to the lock case and/or into connection with the lock case 203 are arranged in the counterpart 101, 301 of the lock, and means are arranged in connection with the lock case 203 for wirelessly receiving 205 electrical power from the means 303 for sending electrical power that are arranged in connection with the counterpart of the lock. Electrical power is arranged to be transmitted from the means of the counterpart of the lock that are for sending 303 electrical power to the means of the lock case that are for receiving 205 electrical power, when the lock case 203 and the counterpart 101, 301 of the lock are at a certain distance from each other. The means for receiving 205 and for sending 303 electrical power are also arranged to transfer encrypted information relating to the operation of the lock.

In one embodiment of the invention the electronics of the lock is configured to activate as a consequence of the connection of power always after the door has closed, and the software of the lock has been configured to start up and begin receiving electrical power, and when the connection transferring electrical power has been formed the lock and the counterpart of the lock are configured to create a data link between the lock and the counterpart of the lock and to authenticate each other.

In one embodiment of the invention, the arrangement is configured to transmit electrical power and information between the lock 102 and the counterpart 101, 301 of the lock only when the door is closed.

In one embodiment of the invention, the means for sending 303 and for receiving 205 electrical power are coils 103, 104, 404.

In one embodiment of the invention, the coils 103, 104, 404 are planar coils in structure.

In one embodiment of the invention, the means for sending 303 electrical power are separate and the means to be installed in connection with the counterpart 101, 301 of the lock and/or the means for receiving 205 electrical power are separate and the means to be installed in connection with the lock 102, 202.

In one embodiment of the invention, the means for receiving 205 electrical power are arranged in the lock case 203 and/or the means for sending 303 electrical power are arranged in the counterpart 101, 301 of the lock.

In one embodiment of the invention, electrical power is configured to be transmitted via an inductive coupling.

In one embodiment of the invention, the lock 102, 202 and the counterpart 101, 301 of the lock comprise means for encrypting and decrypting the information to be transmitted.

The invention also relates to a lock, which comprises a lock case 203 that can be fixed into the door. The lock case comprises a locking latch 204 and a latch mechanism, wherein the latch mechanism comprises electrical means for opening and/or closing the locking latch. Means are arranged in connection with the lock case 203 for wirelessly receiving 205 electrical power from the means for sending electrical power that are arranged in connection with the counterpart of the lock. Electrical power is configured to be received from the means of the counterpart of the lock that are for sending 303 electrical power to the means of the lock case that are for receiving 205 electrical power, when the lock case 203 and the counterpart 101, 301 of the lock are at a certain distance from each other. The means for receiving electrical power are also arranged to receive and to send encrypted information relating to the operation of the lock.

In one embodiment of the invention, the electronics of the lock is configured to activate as a consequence of the connection of power always after the door has closed, and the software of the lock is configured to start up and begin receiving electrical power, and when the connection transferring electrical power has been formed, the lock is configured to create a data link between the lock and the counterpart of the lock and to authenticate itself with the counterpart of the lock.

The invention also relates to a counterpart of the lock, which counterpart can be installed in a door frame. Means for wirelessly sending 303 electrical power to the lock case 203 and/or into connection with the lock case 203 are arranged in connection with the counterpart 101, 301 of the lock. Electrical power is arranged to be sent from the means of the counterpart of the lock that are for sending 303 electrical power to the means of the lock case that are for receiving 205 electrical power, when the lock case 203 and the counterpart 101, 301 of the lock are at a certain distance from each other. The means for sending electrical power are also arranged to receive and to send encrypted information relating to the operation of the lock.

In one embodiment of the invention, the counterpart of the lock is configured to activate always after the door has closed and to begin sending electrical power, and when the connection transferring electrical power has been formed, the counterpart of the lock is configured to create a data link between the lock and the counterpart of the lock and to authenticate itself with the lock.

The invention also relates to a method for transferring electrical power and information with a lock arrangement according to the invention. In the method the counterpart 101, 301 of the lock wirelessly sends electrical power to the lock case 203 and/or into connection with the lock case with the means that are for sending 303 electrical power, and the lock case 203 wirelessly receives electrical power from the means of the counterpart of the lock that are for receiving 205 electrical power. Electrical power is transmitted from the counterpart 101, 301 of the lock to the lock when the lock 102, 202 and the counterpart 101, 301 of the lock are at a certain distance from each other. The means for receiving 205 and for sending 303 electrical power also transfer encrypted information relating to the operation of the lock.

In one embodiment of the invention, the electronics of the lock activates as a consequence of the connection of power always after the door has closed, and the software of the lock starts up and begins to receive electrical power, and when the connection transferring electrical power has been formed, the lock and the counterpart of the lock create a data link between the lock and the counterpart of the lock and authenticate each other.

In one embodiment of the invention, the lock 102, 202 and the counterpart 101, 301 of the lock authenticate each other before starting a transfer of electrical power and/or a transfer of information.

In one embodiment of the invention, the information is encrypted before sending it from the lock 102, 202 to the counterpart 101, 301 of the lock and/or from the counterpart 101, 301 of the lock to the lock 102, 202.

In one embodiment of the invention, the counterpart 101, 301 of the lock scans for the presence of the lock 102, 202 at regular intervals.

It is obvious to the person skilled in the art that the different embodiments of the invention are not either limited solely to the examples described above, and that they may for these reasons be varied within the scope of the claims presented below. The characteristic features possibly presented in the description in conjunction with other characteristic features can if necessary be used separately to each other.

The invention claimed is:

1. A lock arrangement, which comprises a counterpart of the lock and a lock comprising a lock case, wherein the lock case can be fixed into a door and comprises a locking latch and a latch mechanism, which comprises an electrical device for opening and/or closing the locking latch, which counterpart of the lock can be installed in the door frame comprising:

a transmitter for wirelessly sending electrical power to the lock case and/or into connection with the lock case, said transmitter being arranged in the counterpart of the lock, a receiver arranged in connection with the lock case for wirelessly receiving electrical power from the transmitter for sending electrical power that is arranged in connection with the counterpart of the lock, wherein electrical power is arranged to be transmitted from the transmitter of the counterpart of the lock for sending electrical power to the receiver of the lock case for receiving electrical power, when the lock case and the counterpart of the lock are at a certain distance from each other, wherein the transmitter and the receiver of the electrical power are also arranged to transfer encrypted information relating to the operation of the lock, and electronics of the lock being configured to activate as a consequence of a connection of power always after the door has closed and software controlling the lock is configured to start up and begin receiving electrical power, and when the connection transferring electrical power has been formed the lock and the counterpart of the lock are configured to create a data link between the lock and the counterpart of the lock to authenticate each other.

2. The lock arrangement according to claim 1, wherein the arrangement is configured to transmit electrical power and information between the lock and the counterpart of the lock only when the door is closed.

3. The lock arrangement according to claim 1, wherein the transmitter and receiver include coils.

4. The lock arrangement according to claim 3, wherein the coils are planar coils in structure.

5. The lock arrangement according to claim 1, wherein the transmitter for sending electrical power is separate and installed in connection with the counterpart of the lock and/or the receiver for receiving electrical power is separate and installed in connection with the lock.

6. The lock arrangement according to claim 1, wherein the receiver for receiving electrical power is arranged in the lock case and/or the transmitter for sending electrical power is arranged in the counterpart of the lock.

7. The lock arrangement according to claim 1, wherein electrical power is configured to be transmitted via an inductive coupling.

8. The lock arrangement according to claim 1, wherein the lock and the counterpart of the lock include a device for encrypting and decrypting the information to be transmitted.

9. A lock, which comprises:

a lock case for affixing into the door, said lock case including a locking latch and a latch mechanism, wherein the latch mechanism comprises an electrical device for opening and/or closing the locking latch, wherein:

a receiver arranged in connection with the lock case for wirelessly receiving electrical power from a transmitter for sending electrical power that is arranged in connection with the counterpart of the lock, wherein electrical power is configured to be received from the transmitter of the counterpart of the lock for sending electrical power to the receiver of the lock case for receiving electrical power, when the lock case and the counterpart of the lock are at a certain distance from each other, wherein the receiver for receiving electrical power is also arranged to receive and to send encrypted information relating to the operation of the lock, and electronics of the lock being configured to activate as a consequence of a connection of power always after the door has closed and software controlling the lock is configured to start up and begin receiving electrical power, and when the connection transferring electrical power has been formed the lock and the counterpart of the lock are configured to create a data link between the lock and the counterpart of the lock to authenticate each other.

10. A counterpart of a lock for installation in a door frame comprising:

a transmitter for wirelessly sending electrical power to a lock case and/or into connection with the lock case are is arranged in the counterpart of the lock, wherein electrical power is configured to be sent from the transmitter of the counterpart of the lock for sending electrical power to a receiver of the lock case for receiving electrical power, when the lock case and the counterpart of the lock are at a certain distance from each other, wherein the transmitter for sending electrical power is also arranged to receive and to send encrypted information relating to the operation of the lock, and electronics of the lock being configured to activate as a consequence of a connection of power always after the door has closed and software controlling the lock is configured to start up and begin receiving electrical power, and when the connection transferring electrical power has been formed the lock and the counterpart of the lock are configured to create a data link between the lock and the counterpart of the lock to authenticate each other.

11. A for transferring electrical power and information with a lock arrangement, wherein a lock arrangement includes a counterpart of the lock and a lock case, wherein the lock case can be fixed into a door and comprises a locking latch and a latch mechanism, which includes an electrical device for opening and/or closing the locking latch, which counterpart of the lock can be installed in the door frame comprising:

a transmitter for wirelessly sending electrical power to the lock case and/or into connection with the lock case, said transmitter being arranged in the counterpart of the lock, a receiver arranged in connection with the lock case for wirelessly receiving electrical power from the transmitter for sending electrical power that is arranged in connection with the counterpart of the lock, wherein electrical power is arranged to be transmitted from the transmitter of the counterpart of the lock for sending electrical power to the receiver of the lock case for receiving electrical power, when the lock case and the counterpart of the lock are at a certain distance from each other, wherein the transmitter and the receiver of the electrical power are also arranged to transfer encrypted information relating to the operation of the lock, and electronics of the lock being configured to activate as a consequence of a connection of power always after the door has closed and software controlling the lock is configured to start up and begin receiving electrical power, and when the connection transferring electrical power has been formed the lock and the counterpart of the lock are configured to create a data link between the lock and the counterpart of the lock to authenticate each other, the method including the following steps:

sending electrical power from the counterpart of the lock wirelessly to the lock case and/or into connection with the lock case with the transmitter for sending electrical power and receiving electrical power to the lock case wirelessly from the counterpart of the lock with the receiver for receiving electrical power, transmitting electrical power from the counterpart of the lock to the lock when the lock and the counterpart of the lock are at a certain distance from each other, and transferring encrypted information relating to the operation of the lock when receiving and transmitting.

12. The method according to claim 11, wherein the lock and the counterpart of the lock authenticate each other before starting a transfer of electrical power and/or a transfer of information.

13. The method according to claim 11, wherein the information is encrypted before sending it from the lock to the counterpart of the lock and/or from the counterpart of the lock to the lock.

14. The method according to claim 11, wherein the counterpart of the lock scans for the presence of the lock at regular intervals.

* * * * *